(12) United States Patent
Hanlon et al.

(10) Patent No.: US 7,549,605 B2
(45) Date of Patent: Jun. 23, 2009

(54) ELECTRIC FLIGHT CONTROL SURFACE ACTUATION SYSTEM FOR AIRCRAFT FLAPS AND SLATS

(75) Inventors: Casey Hanlon, Queen Creek, AZ (US); Paul T. Wingett, Mesa, AZ (US); Calvin C. Potter, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 151 days.

(21) Appl. No.: 11/192,622

(22) Filed: Jul. 29, 2005

(65) Prior Publication Data

US 2006/0289696 A1  Dec. 28, 2006

Related U.S. Application Data

(60) Provisional application No. 60/694,640, filed on Jun. 27, 2005.

(51) Int. Cl.
*B64C 13/50* (2006.01)

(52) U.S. Cl. ................................. 244/75.1; 244/213

(58) Field of Classification Search ......... 244/211–215, 244/75.1
See application file for complete search history.

(56) References Cited

U.S. PATENT DOCUMENTS

| | | | | |
|---|---|---|---|---|
| 3,111,624 A | * | 11/1963 | Farkas | 455/8 |
| 4,035,705 A | * | 7/1977 | Miller | 318/564 |
| 4,608,820 A | * | 9/1986 | White et al. | 60/39.281 |
| 4,649,484 A | | 3/1987 | Herzog et al. | |
| 4,887,214 A | | 12/1989 | Takats et al. | |
| 5,274,554 A | | 12/1993 | Takats et al. | |
| 5,493,497 A | * | 2/1996 | Buus | 701/4 |
| 5,743,490 A | | 4/1998 | Gillingham et al. | |
| 5,806,805 A | * | 9/1998 | Elbert et al. | 244/195 |
| 5,875,998 A | | 3/1999 | Gleine et al. | |
| 5,913,492 A | | 6/1999 | Durandeau et al. | |
| 6,076,767 A | | 6/2000 | Farley et al. | |
| 6,241,195 B1 | | 6/2001 | Wagner, III | |
| 6,299,108 B1 | | 10/2001 | Lindstrom et al. | |
| 6,349,900 B1 | | 2/2002 | Uttley et al. | |
| 6,389,335 B1 | | 5/2002 | Vos | |
| 6,483,436 B1 | | 11/2002 | Emaci et al. | |
| 6,526,337 B2 | | 2/2003 | Gardner | |

(Continued)

FOREIGN PATENT DOCUMENTS

DE  3032918 A1  3/1982

(Continued)

OTHER PUBLICATIONS

European Search Report, Nov. 24, 2006.

*Primary Examiner*—Tien Dinh
(74) *Attorney, Agent, or Firm*—Ingrassia Fisher & Lorenz, P.C.

(57) ABSTRACT

An aircraft flight control surface actuation system includes a plurality of electric motors-driven flap actuators, and a plurality of electric motor-driven slat actuators. The motor-driven actuators receive activation signals from flap and slat actuator controllers and is, in response to the activation signals, move the flaps and slats between stowed and a deployed positions. The flap and slat actuator controllers each include a plurality of independent actuator control channels that independently supply the activation signals to the motor-driven actuators.

17 Claims, 3 Drawing Sheets

U.S. PATENT DOCUMENTS

| | | |
|---|---|---|
| 6,622,972 B2 | 9/2003 | Urnes, Sr. et al. |
| 6,704,624 B2 * | 3/2004 | Ortega et al. .................. 701/3 |
| 6,705,570 B1 | 3/2004 | Degenholtz et al. |
| 6,755,375 B2 | 6/2004 | Trikha |
| 6,776,376 B2 | 8/2004 | Collins |
| 6,827,311 B2 | 12/2004 | Wingett et al. |
| 6,860,452 B2 | 3/2005 | Bacon et al. |

FOREIGN PATENT DOCUMENTS

| | | |
|---|---|---|
| EP | 1 310 848 A1 | 5/2003 |
| EP | 1 462 361 A1 | 9/2004 |
| WO | WO 2005/002983 A2 | 1/2005 |

* cited by examiner

ELECTRIC FLIGHT CONTROL SURFACE ACTUATION SYSTEM FOR AIRCRAFT FLAPS AND SLATS

CROSS-REFERENCES TO RELATED APPLICATIONS

This application claims the benefit of U.S. Provisional Application No. 60/694,640, filed Jun. 27, 2005.

TECHNICAL FIELD

The present invention relates to flight surface actuation and, more particularly, to an electric flight surface actuation system for aircraft flaps and slats.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. In most instances, this movement is effected via actuators that are coupled to the flight control surfaces. Though unlikely, it is postulated that a flight control surface actuator could become inoperable. Thus, some flight control surface actuation systems are implemented with a plurality of actuators coupled to a single flight control surface.

In many flight control surface actuation systems, the flap actuators and the slat actuators are each driven via a central drive unit and mechanical drive trains. For example, many flight control surface actuation systems include a central flap drive unit that drives each of the flap actuators via a plurality of gears and either torque tubes or flexible shafts. Similarly, many flight control surface actuation systems include a separate central slat drive unit that drives each of the slat actuators via a plurality of gears and either torque tubes or flexible shafts. The central drive units, for both the flaps and the slats, are typically hydraulically powered devices.

Although the flight control surface actuation systems that use central flap and slat drive units are generally safe, reliable, and robust, these systems do suffer certain drawbacks. Namely, these systems can be relatively complex, can involve the use of numerous parts, and can be relatively heavy.

Hence, there is a need for a flight control surface actuation system that is less complex and/or uses less parts and/or is lighter than systems that use central drive units to drive the aircraft flap and slat actuators. The present invention addresses one or more of these needs.

BRIEF SUMMARY

The present invention provides a relatively lightweight flight control surface actuation system for aircraft flaps and slats.

In one embodiment, and by way of example only, a flight control surface actuation system for aircraft having a plurality of flaps and slats on each aircraft wing includes a plurality of electric motors, a plurality of flap actuators, a plurality of slat actuators, a plurality of flap actuator controllers, and a plurality of slat actuator controllers. Each electric motor is coupled to receive activation signals and is operable, upon receipt thereof, to supply a drive force. Each flap actuator is coupled to receive the drive force from at least one of the electric motors, to thereby move a flap between a stowed and a deployed position. Each slat actuator is coupled to receive the drive force from at least one of the electric motors, to thereby move a slat between a stowed and a deployed position. Each flap actuator controller includes a plurality of independent flap actuator control channels that are each coupled to at least one of the electric motors that supply the drive force to a flap actuator and are each configured to supply the activation signals thereto. Each slat actuator controller includes a plurality of independent slat actuator control channels that are each coupled to at least one of the electric motors that supply the drive force to a slat actuator and are each configured to supply the activation signals thereto.

Other independent features and advantages of the preferred flight control surface actuation system will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
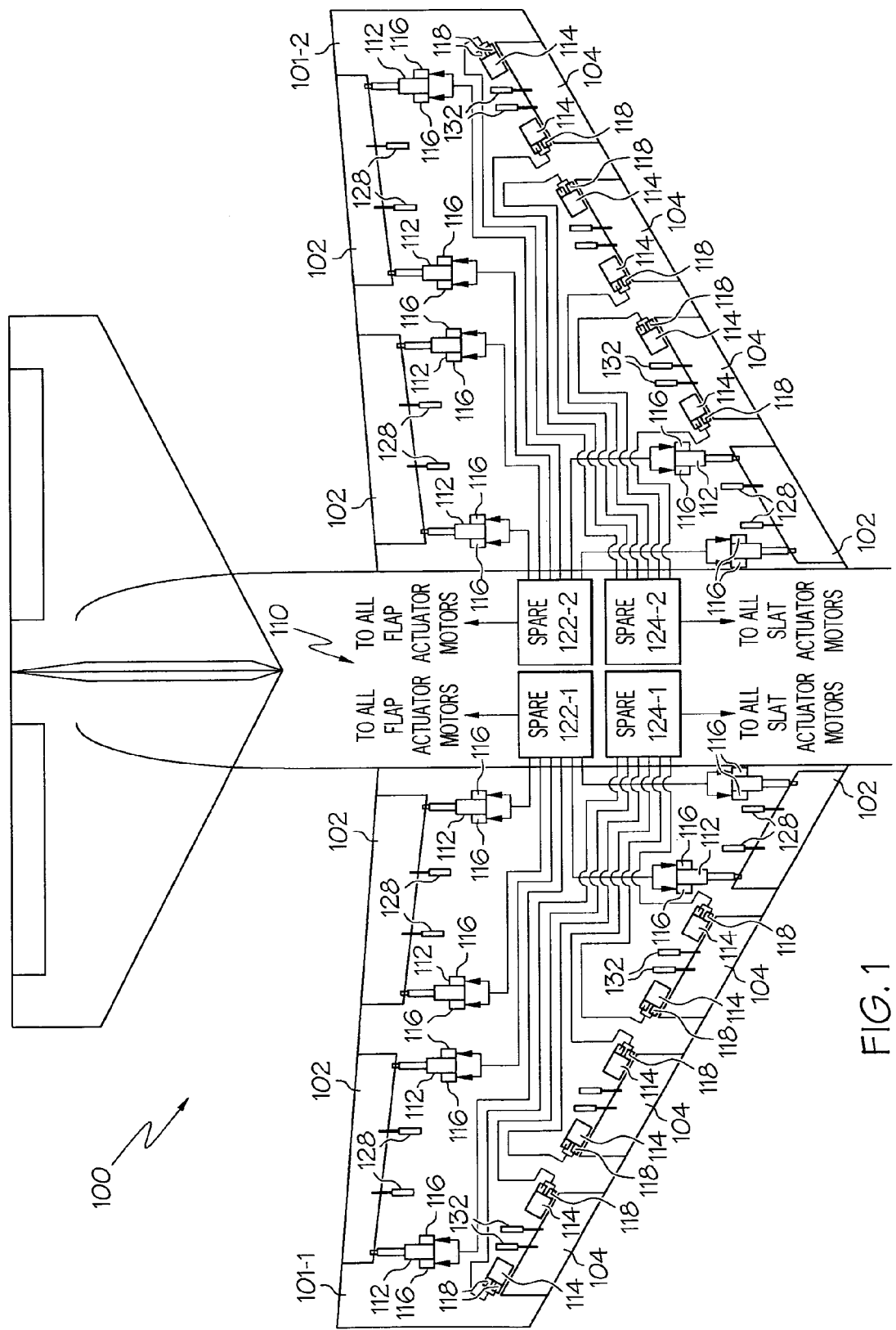
FIG. 1 is a schematic diagram of a portion of an exemplary aircraft depicting an exemplary embodiment of a flight control surface actuation system for aircraft flaps and slats.

Turning first to FIG. 1, a schematic diagram of a portion of an exemplary aircraft 100 depicting an exemplary embodiment of a flight control surface actuation system 110 for aircraft flaps and slats is provided. The aircraft 100 includes a plurality of control surfaces on each wing 101 (101-1, 101-2), namely a plurality of flaps 102 and a plurality of slats 104. In the depicted embodiment, the aircraft 100 includes not only a plurality of trailing edge flaps 102, but additionally includes a leading edge flap 102, sometimes referred to as a Krueger flap, on each wing 101. It will be appreciated, however, that this is merely exemplary, and that the flight control surface actuation system 110 could be implemented in aircraft 100 that do not include a Krueger flap on each wing 101. It will additionally be appreciated that the aircraft 100 will typically include various primary flight control surfaces, and may additionally include various other secondary control surfaces, such as spoilers. However, for clarity and ease of illustration and description, these other control surfaces are not depicted or further described.

The flaps 102 and slats 104 are high-lift devices that influence the lift and drag of the aircraft 100. For example, during aircraft take-off and landing operations, when increased lift is desirable, the flaps 102 and slats 104 may be moved from stowed positions to deployed positions. In the deployed position, the flaps 104 increase both lift and drag, and enable the aircraft 100 to descend more steeply for a given airspeed, and also enable the aircraft 100 become airborne over a shorter distance. The slats 104, in the deployed position, increase lift, and are typically used in conjunction with the flaps 102.

The flaps 102 and slats 104 are moved between the stowed and deployed positions via the flight control surface actuation system 110. The flight control surface actuation system 110 includes a plurality of flap actuators 112, which are used to move the flaps 104, and a plurality of slat actuators 114, which are used to move the slats 104. The flight control surface actuation system 110 may be implemented using various numbers and types of flap and slat actuators 112, 114. In addition, the number and type of flap and slat actuators 112, 114 per control surface 102, 104 may be varied. In the depicted embodiment, the system 110 is implemented such that two flap actuators 112 are coupled to each flap 102, and two slat actuators 114 are coupled to each slat 104. Moreover, each flap actuator 112 is preferably a linear-type actuator, such as, for example, a ballscrew actuator, and each slat actuator 114 is preferably a rotary-type actuator. It will be appreciated that this number and type of flap actuators 102 and this number and type of slat actuators 114 is merely exemplary of a preferred embodiment, and that other numbers and types of actuators 112, 114 could also be used.

The actuators 112, 114 are each driven by one or more electric actuator motors 116, 118. Preferably, as is shown in FIG. 1, two actuator motors 116 are associated with each flap actuator 112 such that either flap actuator motor 116, or both flap actuator motors 116, can drive the associated flap actuator 112. Similarly, two actuator motors 118 are preferably associated with each slat actuator 114 such that either slat actuator motor 118, or both slat actuator motors 118, can drive the associated slat actuator 114. The flap and slat actuator motors 116, 118 each receive activation signals and, in response, rotate in one direction or another, to thereby supply a drive force to its associated flap actuator 112 or slat actuator 114. The flap and slat actuators 112, 114 are each coupled to receive the drive force supplied from its associated actuator motors 116, 118 and, depending on the direction in which the actuator motors 116, 118 rotate, move between stowed and deployed positions, to thereby move the flaps 102 and slats 104 between stowed and deployed positions. It will be appreciated that the actuator motors 116, 118 may be implemented as any one of numerous types of AC or DC motors, but in a preferred embodiment the. actuator motors 116, 118 are preferably implemented as DC motors.

The flight control surface actuation system 110 additionally includes a plurality of controllers. It will be appreciated that the number and configuration of actuator controllers may vary. However, the flight control surface actuation system 110 preferably includes a plurality of flap actuator controllers 122 and a plurality of slat actuator controllers 124. More specifically, in the embodiment depicted in FIG. 1, the flight control surface actuation system 110 includes two multi-channel flap actuator controllers 122-1, 122-2, and two multi-channel slat actuator controllers 124-1, 124-2. The flap actuator controllers 122 are configured such that one of the flap actuator controllers 122-1 controls the flap actuators 112 on one wing 101-1, and the other flap actuator controller 122-2 controls the flap actuators 112 on the other wing 101-1. Similarly, the slat actuator controllers 124 are configured such that one of the slat actuator controllers 124-1 controls the slat actuators 114 on one wing 101-1, and the other slat actuator controller 124-2 controls the slat actuators 114 on the other wing 101-1.

The flap and slat actuator controllers 122, 124, as was noted above, are preferably implemented as multi-channel controllers. Although the number and configuration of actuator control channels in each multi-channel controller 122, 124 may vary, it will be appreciated that each controller 122, 124 preferably includes one independent actuator control channel per actuator 112, 114, plus at least one spare actuator control channel. Thus, for the embodiment depicted in FIG. 1, each flap actuator controller 122 includes six independent actuator control channels and at least one spare actuator control channel, for a total of at least seven actuator control channels. The six independent actuator control channels in each flap controller 122 are each independently coupled to both flap actuator motors 116 on one flap actuator 112, and each spare actuator control channel is coupled to all of the flap actuator motors 116. Similarly, each slat actuator controller 124 in the depicted embodiment includes six independent actuator control channels and at least one spare actuator control channel, for a total of at least seven actuator control channels. The six independent actuator control channels in each slat actuator controller 124 are each independently coupled to both slat actuator motors 118 on one slat actuator 114, and each spare actuator channel is coupled to all of the slat actuator motors 118.

With the above-described flap and slat actuator controller 122, 124 configuration, if one of the independent actuator control channels in a flap or slat actuator controller 122, 124 becomes inoperable, a spare actuator control channel in the affected controller 122, 124 can be used to supply activation signals to the flap or slat actuator motors 116, 118 associated with the inoperable actuator control channel. In this regard, it will be appreciated that the flap and slat actuator controllers 122, 124 are additionally each configured to determine if an associated actuator channel or an associated actuator motor 116, 118 has become inoperable.

It will be appreciated that the above-described flap and slat actuator controller 122, 124 configurations are merely exemplary, and that the flap and slat actuator controllers 122, 124 may be implemented using any one of numerous other configurations. For example, the flap and slat actuator controllers 122, 124 could be implemented with one independent control channel per actuator motor 116, 118 (e.g., two independent actuator control channels per actuator 112, 114) plus at least one spare actuator control channel. Thus, for the aircraft 100 depicted in FIG. 1, each flap actuator controller 122 would include twelve independent actuator control channels and at least one spare actuator control channel, for a total of at least thirteen actuator control channels. The twelve independent actuator control channels in each flap controller 122 would each be independently coupled to a single flap actuator motor 116, and each spare actuator control channel would be coupled to all of the flap actuator motors 116. Similarly, each slat actuator controller 124 would include twelve independent actuator control channels and at least one spare actuator control channel, for a total of at least thirteen actuator control channels. The twelve independent actuator control channels in each slat actuator controller 124 would each be independently coupled to a single slat actuator motor 118, and each spare actuator control channel would be coupled to all of the slat actuator motors 118. With this configuration, if one of the independent actuator control channels in a flap or slat actuator controller 122, 124 became inoperable, a spare actuator control channel in the affected controller 122, 124 would be used to supply activation signals to the flap or slat actuator motor 116, 118 associated with the inoperable actuator control channel.

With the above-described alternative embodiment, the actuator controllers 122, 124 could be implemented such that only one of the independent actuator control channels per actuator 112, 114 is active, while the other actuator control channel is in a standby, or inactive mode. Alternatively, both actuator control channels per actuator 112, 114 could be active. The specific implementation may vary and may depend, for example, on the type and size of actuators 112, 114 and/or on the type and size of actuator motors 116, 118. If the actuator controllers 122, 124 are implemented such that one independent actuator control channel per actuator 112, 114 is active, and the other actuator control channel is inactive, then the actuator controllers 122, 124 would be further configured to determine if one of its active actuator control channels has become inoperable and, if so, activate the appropriate inactive actuator control channel.

Although not depicted in FIG. 1, it will be appreciated each actuator motor 116, 118 preferably includes a motor resolver unit. The motor resolver units sense the rotational position of the actuator motors 116, 118 and supply motor position signals representative thereof to the appropriate actuator controller 122, 124. The actuator controllers 122, 124 use the motor position signals to, for example, synchronize its associated actuator motors 116, 118. The actuator controllers 122, 124 may also use the motor position signals to determine the position of the flaps 112 or slats 114, and to determine whether an actuator motor 116, 118 and/or an actuator channel has become inoperable.

In addition to, or instead of, using the motor position signals to synchronize the actuator motors 116, 118 and/or determine flap 112 or slat 114 position, and/or determine whether an actuator motor 116, 118 and/or an actuator channel has become inoperable, the system 110 may include a plurality of flap position sensors 128 and/or a plurality of slat position sensors 132. For example, in the depicted embodiment, a pair of flap position sensors 128 is coupled to each of the flaps 112, and a pair of slat position sensors 132 is coupled to each of the slats 114. The flap and slat position sensors 128, 132 sense flap and slat positions, respectively, and supply flap and slat position signals representative thereof, respectively, to the appropriate flap and slat actuator controllers 122, 124. For clarity, the communication links between the position sensors 128, 132 and controllers 122, 124 are not shown. The flap and slat position sensors 128, 132 may be implemented using any one of numerous types of sensors including, for example, linear variable differential transformers (LVDTs), rotary variable differential transformers (RVDTs), Hall effect sensors, or potentiometers, just to name a few. It will be appreciated that the flight control surface actuation system 110 could be implemented without the flap sensors 128 and/or without the slat sensors 132.

No matter which mechanism or mechanisms are used, be it motor resolvers, position sensors, or combination of both, the flap actuator controllers 122 synchronize the movement of the flaps 102 on each wing between the stowed and deployed positions. Similarly, the slat actuators 124 synchronize the movement of the slats 104 on each wing between the stowed and deployed positions.

Moreover, though not depicted, it will additionally be appreciated that in addition to, or instead of, the flap and slat position sensors 128, 132, the flap actuators 112 and/or slat 114 actuators may be implemented with an actuator position sensor and used to supply actuator position signals to the appropriate actuator controller 122, 124. The flap and slat controllers 122, 124 may use the actuator position signals to determine flap and slat position, respectively, in addition to or instead of the flap and slat position signals supplied from the flap and slat position sensors 128, 132.

Figure 2:
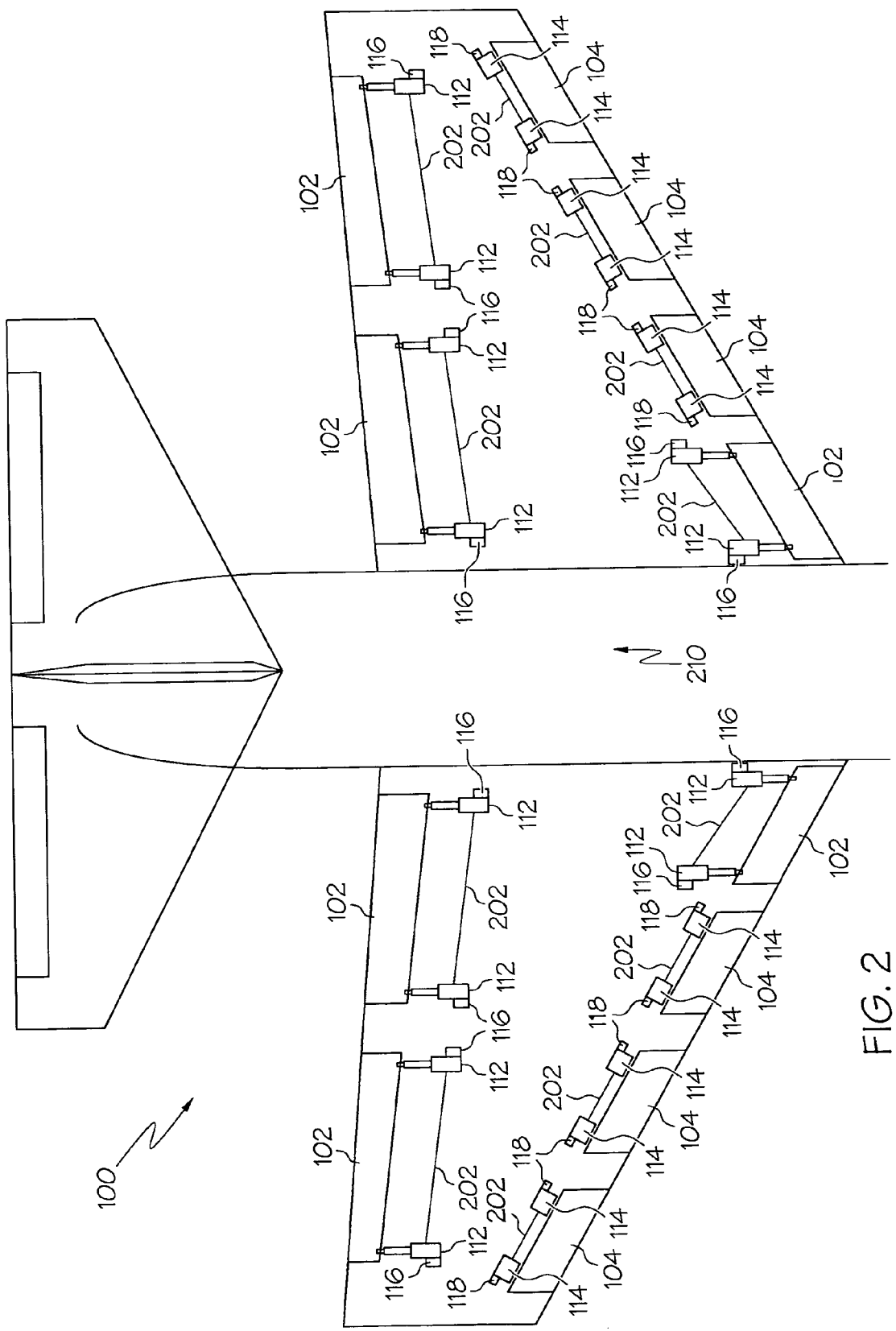
FIG. 2 is a schematic diagram the exemplary aircraft of FIG. 1, depicting an exemplary alternative embodiment of a flight control surface actuation system for aircraft flaps and slats.

In addition to variations in controller 122, 124 configurations, the system 110 may also be implemented using various flap and slat actuator 112, 114 configurations. For example, in one alternative embodiment, which is shown in FIG. 2, a flight control surface actuation system 210 is implemented such that the flap actuators 112 and slat actuators 114 each have only one flap actuator motor 116 and one slat actuator motor 118, respectively. Thus, to provide sufficient redundancy a drive mechanism 202, such as a torque tube or flexible shaft, mechanically interconnects each of the flap actuators 112 that are coupled to the same flap 102, and each of the slat actuators 114 that are coupled to the same slat 104. It will be appreciated that, for clarity and ease of illustration, the controllers 122, 124, position sensors 128, 132, and the interconnecting communication links are not illustrated in FIG. 2.

With the alternative flight control surface actuation system 210 of FIG. 2, the flap and slat actuator controllers 122, 124 are preferably implemented with one independent actuator control channel per flap and slat actuator motor 116, 118, respectively. The flap and slat actuator controllers 122, 124 are also preferably configured to supply activation signals to each of the flap and slat actuator motors 116, 118, respectively, to move the flaps 112 and slats 114, respectively. Thus, if one of the actuator motors 116 or 118, or its associated actuator control channel, were to become inoperable, the affected actuator 112 or 114 would be driven, via the associated drive mechanism 202, by the remaining operable actuator motor 116 or 118 on the actuator 112 or 114 that is coupled to the same flap or slat 102 or 104.

Figure 3:
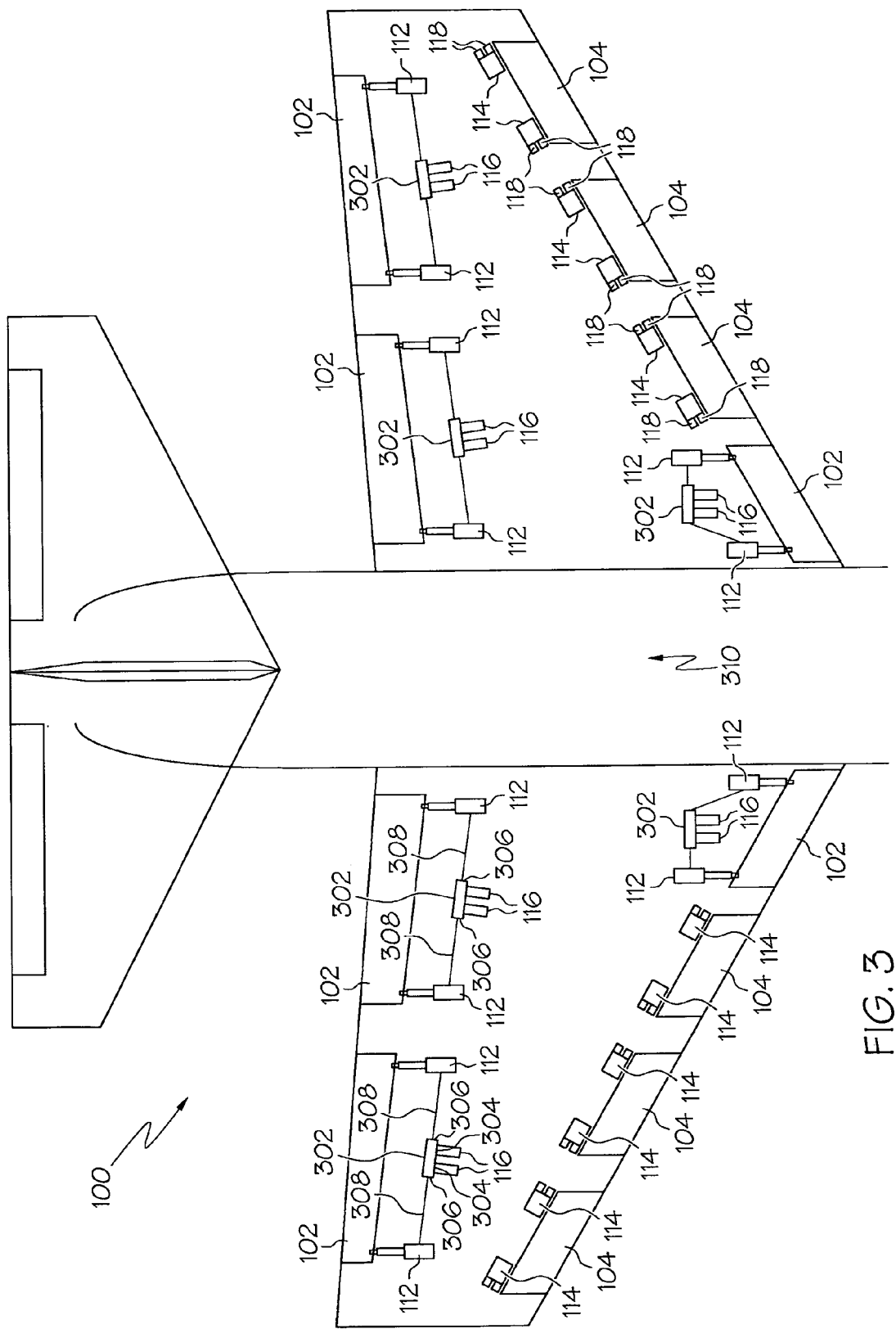
FIG. 3 is a schematic diagram the exemplary aircraft of FIG. 1, depicting an another exemplary alternative embodiment of a flight control surface actuation system for aircraft flaps and slats.

In yet another alternative embodiment, which is shown in FIG. 3, a flight control surface actuation system 310 is implemented such that a pair of flap actuator motors 116 drives each of the flap actuators 112 that are coupled to the same flap 102. More specifically, each pair of flap actuator motors 116 is coupled to, and supplies a drive force to, a speed-sum gear assembly 302. The speed-sum gear assemblies 302 each include two inputs 304 and two outputs 306. The two speed-sum gear assembly inputs 304 are coupled, one each, to one of the pairs of flap actuator motors 116. The two speed-sum gear assembly outputs 306 are in turn coupled, one each, to one of the pair of flap actuators 112 that are coupled to the same flap 102, via a drive mechanism 308, such as a torque tube or flexible shaft. As with the embodiment shown in FIG. 2, it will be appreciated that FIG. 3, also for clarity and ease of illustration, does not depict the controllers 122, 124, position sensors 128, 132, and the interconnecting communication links.

With the alternative flight control surface actuation system 310 of FIG. 3, the flap actuator controllers 122 are preferably implemented with one independent actuator control channel per flap actuator motor 116. The flap actuator controllers 122 are also preferably configured to supply activation signals to each of the flap actuator motors 116, to move the flaps 112.

Thus, if one of the actuator motors 116, or its associated actuator control channel, were to become inoperable, the affected pair of flap actuators 112 would be driven, via the associated drive mechanism 308, by the remaining operable flap actuator motor 116.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A flight control surface actuation system for aircraft having a plurality of flaps and slats on each aircraft wing, the system comprising:
    a plurality of electric motors, each electric motor coupled to receive activation signals and operable, upon receipt thereof, to supply a drive force;
    a plurality of flap actuators, each flap actuator coupled to receive the drive force from at least one of the electric motors, to thereby move a flap between a stowed and a deployed position;
    a plurality of slat actuators, each slat actuator coupled to receive the drive force from at least one of the electric motors, to thereby move a slat between a stowed and a deployed position; and
    a flap actuator controller including a plurality of independent flap actuator control channels and a single spare flap actuator control channel, each flap actuator control channel of the plurality of independent flap actuator control channels (i) exclusively coupled to at least one of the plurality of electric motors that supplies the drive force to a particular flap actuator and (ii) configured to supply the activation signals thereto, the single spare flap actuator control channel coupled to all of the plurality of electric motors on one aircraft wing; and
    a slat actuator controller including a plurality of independent slat actuator control channels and a single spare slat actuator control channel, each slat actuator control channel of the plurality of independent slat actuator control channels (i) exclusively coupled to at least one of the plurality of electric motors that supplies the drive force to a particular slat actuator and (ii) configured to supply the activation signals thereto, the single spare slat actuator control channel coupled to all of the plurality of electric motors on one aircraft wing.

2. The system of claim 1, wherein each flap actuator is coupled to receive the drive force supplied from two electric motors.

3. The system of claim 2, wherein each flap actuator control channel is coupled to two electric motors, whereby each flap actuator has one flap actuator control channel associated therewith.

4. The system of claim 2, wherein:
    each flap actuator control channel is coupled to only one electric motor, whereby each flap actuator has two flap actuator control channels associated therewith; and
    each flap actuator controller is configured such that one of the flap actuator control channels associated with each flap actuator is active and the other flap actuator control channel associated with each flap actuator is inactive.

5. The system of claim 2, wherein:
    each flap actuator control channel is coupled to only one electric motor, whereby each flap actuator has two flap actuator control channels associated therewith; and
    each flap actuator controller is configured such that both of the flap actuator control channels associated with each flap actuator are active.

6. The system of claim 2, further comprising:
    a plurality of drive mechanisms, each drive mechanism coupled between two flap actuators.

7. The system of claim 2, further comprising:
    a plurality of speed-sum gear assemblies, each speed-sum gear assembly having two inputs and two outputs, each speed-sum gear assembly input coupled to receive the drive force from two electric motors, each speed-sum gear assembly output coupled to supply the received drive force to one of the flap actuators.

8. The system of claim 7, further comprising:
    a plurality of drive mechanisms, each drive mechanism coupled between a speed-sum gear assembly outputs and a flap actuator.

9. The system of claim 8, wherein each drive mechanism comprises a flexible shaft.

10. The system of claim 8, wherein each drive mechanism comprises a torque tube.

11. The system of claim 1, wherein each slat actuator is coupled to receive the drive force supplied from two electric motors.

12. The system of claim 11, wherein each slat actuator control channel is coupled to two electric motors, whereby each slat actuator has one slat actuator control channel associated therewith.

13. The system of claim 11, wherein:
    each slat actuator control channel is coupled to only one electric motor, whereby each slat actuator has two slat actuator control channels associated therewith; and
    each slat actuator controller is configured such that one of the slat actuator control channels associated with each slat actuator is active and the other slat actuator control channel associated with each slat actuator is inactive.

14. The system of claim 11, wherein:
    each slat actuator control channel is coupled to only one electric motor, whereby each slat actuator has two flap actuator control channels associated therewith; and
    each slat actuator controller is configured such that both of the slat actuator control channels associated with each slat actuator are active.

15. The system of claim 1, wherein:
    each flap actuator is a linear actuator; and
    each slat actuator is a rotary actuator.

16. The system of claim 1, wherein:
    at least two flap actuators are coupled to a single flap; and
    at least two slat actuators are coupled to a single slat.

17. The system of claim 1, wherein:
    each flap actuator controller is associated with one of the aircraft wings; and
    each slat actuator controller is associated with one of the aircraft wings.

* * * * *